US007727463B2

United States Patent
Arai et al.

(10) Patent No.: US 7,727,463 B2
(45) Date of Patent: *Jun. 1, 2010

(54) STEEL PIPE FOR AN AIRBAG SYSTEM

(75) Inventors: Yuji Arai, Amagasaki (JP); Kunio Kondo, Sanda (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 11/266,265

(22) Filed: Nov. 4, 2005

(65) Prior Publication Data

US 2006/0130945 A1 Jun. 22, 2006

Related U.S. Application Data

(63) Continuation-in-part of application No. 10/848,119, filed on May 19, 2004, now abandoned.

(30) Foreign Application Priority Data

May 21, 2003 (JP) ............................. 2003-143764

(51) Int. Cl.
*C22C 38/18* (2006.01)
*C22C 38/00* (2006.01)
*C21D 1/00* (2006.01)
(52) U.S. Cl. .................. 420/104; 148/333; 148/570
(58) Field of Classification Search ................. 420/105, 420/104; 148/333, 334, 570
See application file for complete search history.

(56) References Cited

U.S. PATENT DOCUMENTS

| 2002/0033591 | A1 | 3/2002 | Erike |
| 2003/0155052 | A1 | 8/2003 | Kondo et al. |
| 2003/0217795 | A1* | 11/2003 | Asahi et al. ................. 148/593 |
| 2005/0076975 | A1 | 4/2005 | Lopez et al. |
| 2006/0070687 | A1 | 4/2006 | Miyata et al. |

FOREIGN PATENT DOCUMENTS

| JP | 08-325641 | 12/1996 |
| JP | 10-140238 | 5/1998 |
| JP | 10-140249 | 5/1998 |
| JP | 10-140250 | 5/1998 |
| JP | 10-140283 | 5/1998 |

(Continued)

*Primary Examiner*—Roy King
*Assistant Examiner*—Caitlin Fogarty
(74) *Attorney, Agent, or Firm*—Clark & Brody

(57) ABSTRACT

A high strength steel pipe for an airbag system has a steel composition comprising C: 0.05-0.20%, Si: 0.1-1.0%, P: at most 0.025%, S: at most 0.010%, Cr: 0.05-1.0%, Al: at most 0.10%, at least one of Ti and Mn satisfying (1) Ti≦0.02% and (2) 0.4%≦Mn+40Ti≦1.2%, and a remainder of Fe. The composition may further include one or more of (i) at least one of Mo: 0.05-0.50%, Ni: 0.05-1.5%, V: 0.01-0.2%, and B: 0.0003-0.005%, (ii) at least one of Cu: 0.05-0.5% and Nb: 0.003-0.1%, and (iii) at least one of Ca: 0.0003-0.01%, Mg: 0.0003-0.01%, and REM: 0.0003-0.01%. The steel pipe can be manufactured by forming a pipe from the above-described steel composition to obtain prescribed dimensions, heating to at least the $Ac_1$ transformation point and quenching, and then tempering at the $Ac_1$ transformation point or below.

12 Claims, 2 Drawing Sheets

FOREIGN PATENT DOCUMENTS

| | | |
|---|---|---|
| JP | 10-212549 | 8/1998 |
| JP | 11-199929 | 7/1999 |
| JP | 2001-049343 | 2/2001 |
| JP | 2002-194501 | 7/2002 |
| JP | 2002-294339 | 10/2002 |

* cited by examiner

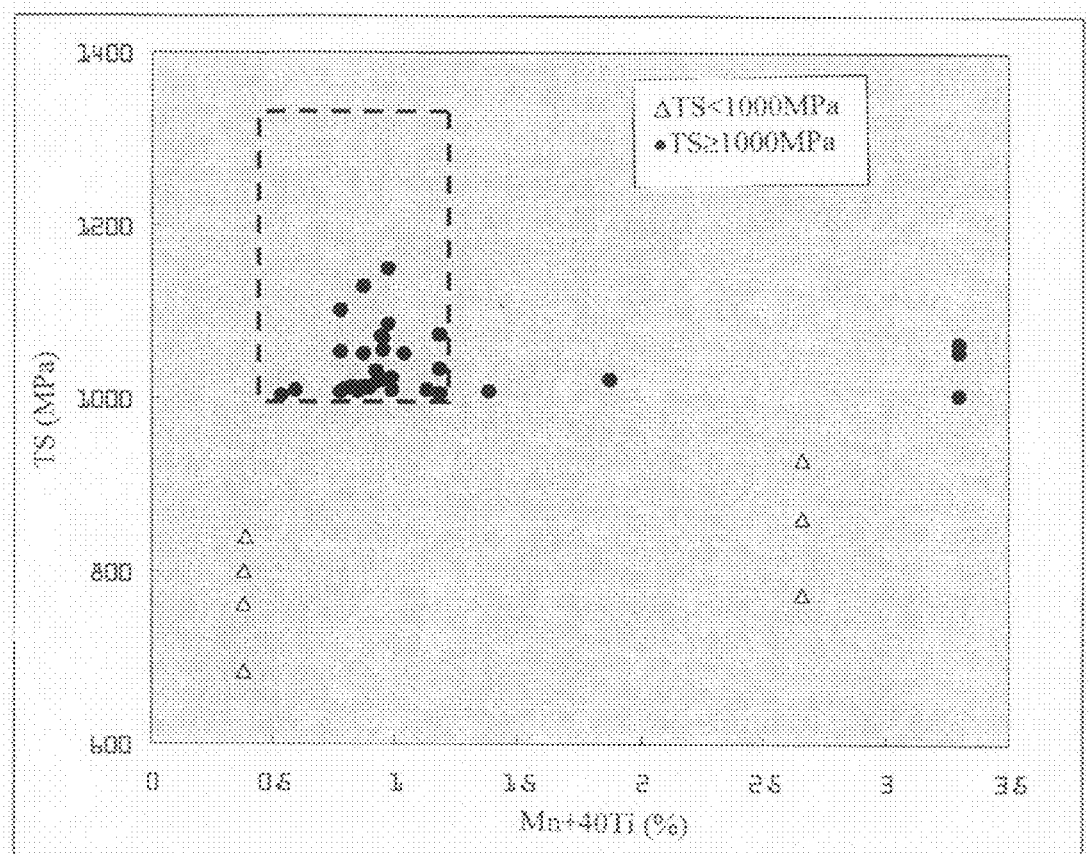

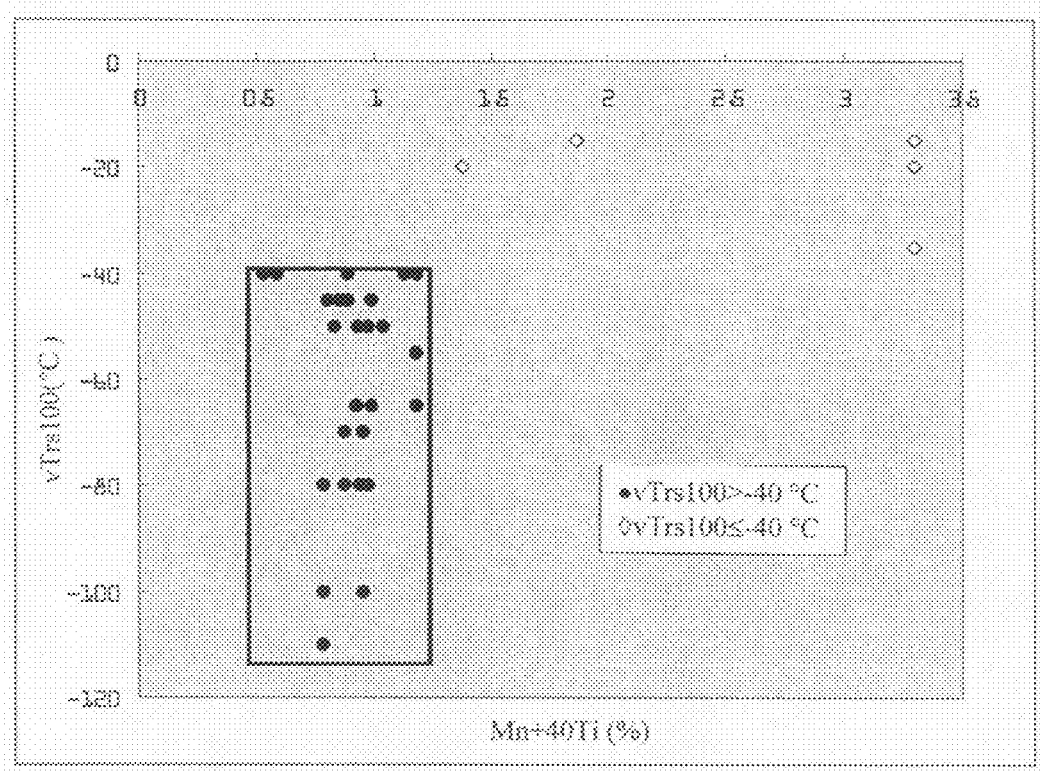

STEEL PIPE FOR AN AIRBAG SYSTEM

CROSS-REFERENCE TO RELATED APPLICATIONS

This application is a Continuation-In-Part of U.S. patent application Ser. No. 10/848,119 filed May 19, 2004 now abandoned.

TECHNICAL FIELD

This invention relates to a steel pipe which is suitable for use with an airbag system and which has a high tensile strength of at least 1000 MPa along with a high toughness. It also relates to a method for the manufacture of such a steel pipe. In particular, the present invention relates to a steel pipe for an airbag system and to a method for its manufacture, the pipe having a high strength and high toughness to such a degree that when a pipe sample having a small wall thickness is subjected to an internal pressure bursting test at −40° C. and even at −80° C., it does not undergo brittle fracture.

BACKGROUND ART

In recent years, there has been much emphasis in the automotive industry on the introduction of equipment for increasing the safety of vehicles. An example of such equipment is an airbag system, which causes an airbag to be inflated with gas between passengers and the steering wheel, the dashboard, or other portions of the vehicle interior before the passengers can impact therewith at the time of a collision and thereby absorbs the kinetic energy of the passengers so as to decrease the likelihood and severity of injuries.

A conventional airbag system employs an explosive chemical to generate a gas to inflate an airbag. However, due to a desire for a quick response to airbag inflation and for adjustment of the pressure of an inflating gas, another type of airbag system which employs a gas accumulated in a steel pipe under high pressure to inflate an airbag has been developed and is being increasingly employed.

An airbag system of the latter type normally maintains an inflating gas at a high pressure in an accumulator. When a collision occurs, the inflating gas in the accumulator is discharged all at once into an airbag. As a result, a steel pipe which is used as an accumulator for the high pressure inflating gas undergoes stress in an extremely short period of time at a high strain rate. Therefore, in contrast to a simple structural member such as a conventional pressure cylinder or line pipe, the steel pipe used as the inflating gas accumulator in such an airbag system is required to have high dimensional accuracy, workability, and weldability, and it is also required to have high strength and excellent resistance to bursting.

A steel pipe which is suitable for use with an airbag system to form an inflating gas accumulator and a method for its manufacture are described in the following published Japanese patent applications: JP P10-140238A, JP P10-140249A, JP P10-140250A, JP P10-140283A, JP P10-212549A, JP P2002-294339A, JP P11-19929A, JP P2001-49343A, and JP P2002-194501A.

Although the above-listed patent applications aim at providing a high strength, high toughness steel pipe suitable for use with an airbag system, the target tensile strength described in those applications is on the level of 590 MPa or above, and the values of tensile strength obtained in the examples of those applications are no higher than 947 MPa.

The steel pipes disclosed in the above patent applications can provide adequate performance for existing airbag systems. However, as a result of the trend in recent years towards decreases in the weight of automobiles, there has also come to be a demand for decreases in the size and weight of airbag systems. Accordingly, there is a demand for steel pipes for airbag systems to be able to accumulate an inflating gas at a higher pressure while having a smaller wall thickness.

SUMMARY OF THE INVENTION

The present invention provides a high strength, high toughness steel pipe suitable for use with airbag systems (i.e., for use in forming inflating gas accumulators for airbag systems) which can satisfy properties which are demanded today as described above. The present invention also provides a method for the manufacture of such a steel pipe.

The present inventors found that in order to provide a steel pipe for airbag systems with a high tensile strength and excellent resistance to bursting so as to meet the demand for higher accumulator pressures and smaller wall thicknesses, it is necessary for the steel pipe to have the following properties:

(a) a tensile strength of at least 1000 MPa, and (b) a sufficient toughness as demonstrated in a Charpy impact test by exhibiting 100% ductile fracture at −40° C., preferably 100% ductile fracture at −60° C., and more preferably 100% ductile fracture at −80° C.

From the standpoint of safety, it is also important for the steel pipe to have good resistance to bursting, which is demonstrated in an internal pressure bursting test under hydrostatic pressure at −40° C. by there being no occurrence of brittle fracture and there being no cracks which extend over the entire length of the steel pipe. It is still more desirable that such resistance to bursting be demonstrated in an internal pressure bursting test at −80° C.

According to the present invention, a steel pipe having a high strength of at least 1000 MPa and a high toughness as evidenced by 100% ductile fracture at −40° C. in a Charpy impact test as well as the above-described good resistance to bursting can be obtained by selecting a specific steel composition.

According to one form of the present invention, a steel pipe suitable for use with an airbag system (to form an inflating gas accumulator for the airbag system) is made of a steel having a composition which consists essentially, in mass %, of: C: 0.05-0.20%, Si: 0.1-1.0%, P: at most 0.025%, S: at most 0.010%, Cr: 0.05-1.0%, Al: at most 0.10%, one or both of Ti and Mn in amounts sufficient to satisfy the following equations (1) and (2), and a remainder of Fe and impurities:

$$\mathrm{Ti} \leq 0.02\% \qquad (1)$$

$$0.4\% \leq \mathrm{Mn} + 40\mathrm{Ti} \leq 1.2\% \qquad (2).$$

The steel pipe has a tensile strength of at least 1000 MPa.

Optionally, the steel composition may further comprise one or more of Mo: 0.05-0.50%, Ni: 0.05-1.5%, V: 0.01-0.2%, and B: 0.0003-0.005%.

Optionally the steel composition may further comprise one or two of Cu: 0.05-0.5% and Nb: 0.003-0.1%.

Optionally the steel composition may further comprise one or more of Ca: 0.0003-0.01%, Mg: 0.0003-0.01%, and REM: 0.0003-0.01%.

According to another form of the present invention, a method of manufacturing a steel pipe for an airbag system comprises forming a pipe having prescribed dimensions from a steel having the above-described composition by a process including pipe making and subsequent cold working, then heating the cold-worked pipe to at least the $Ac_1$ transformation point of the steel followed by quenching, and tempering the quenched pipe at a temperature no higher than the $Ac_1$ transformation point of the steel.

In a preferred embodiment of the method, the cold-worked steel pipe is heated to at least the $Ac_3$ transformation point of the steel and more preferably from 900° C. to 1000° C. This heating is preferably performed by rapid heating at a rate of temperature increase of at least 10° C./sec by means of high frequency induction heating, for example. The subsequent quenching is preferably performed such that the cooling rate at least in the temperature range of from 850° C. to 500° C. is at least 20° C./sec. In this manner, a steel pipe having an as-quenched fine microstructure with a γ grain size number of 11 or larger (the larger the number, the finer the γ grain size). Such a steel pipe exhibits extremely good resistance to bursting as demonstrated by no cracks progressing significantly even in an internal pressure bursting test at −80° C.

None of the above-listed patent documents discloses a steel which has the above-described specific steel composition while satisfying the above equation, and which has both a high strength of at least 1000 MPa and a high toughness in the form of 100% ductile fracture at −40° C. The tensile strengths of steels disclosed in these patent documents are shown in FIG. 2 as a function of the value of (Mn+40Ti).

DESCRIPTION OF PREFERRED EMBODIMENTS

Figure 1:
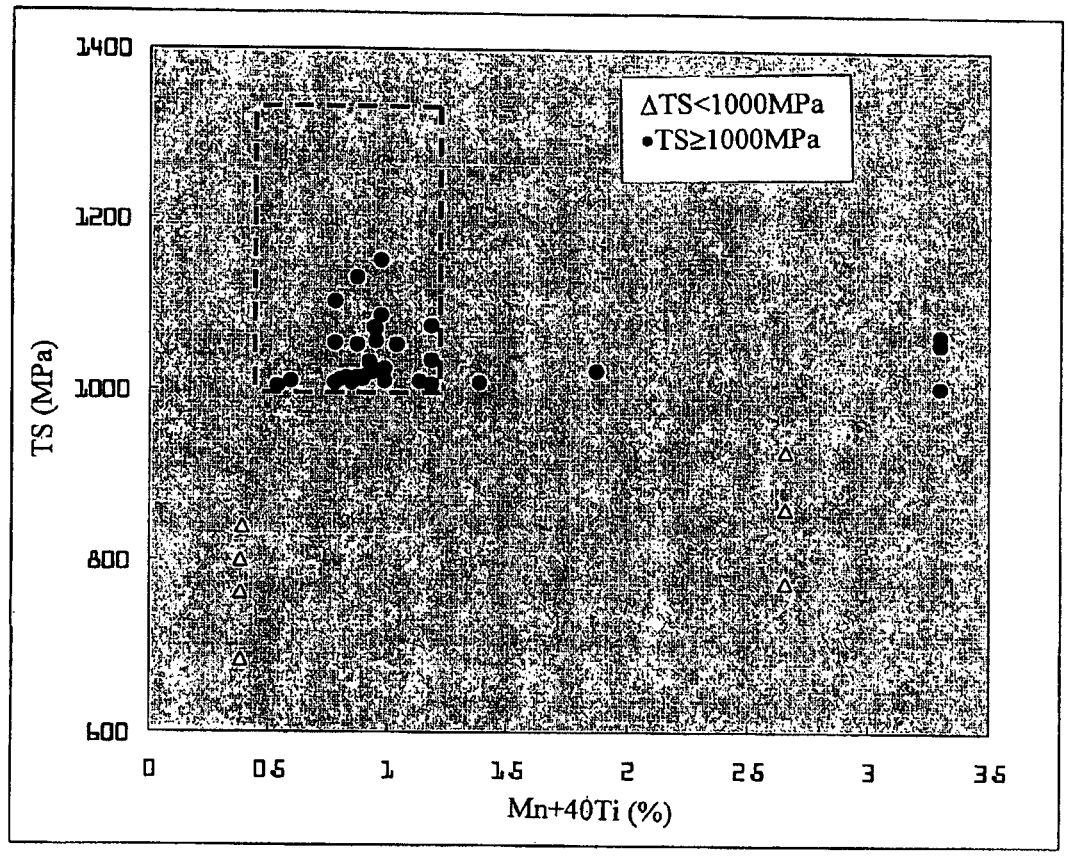
FIG. 1 is a graph showing the tensile strength in the circumferential direction of a steel pipe as a function of the value of vTrs100, which is defined below.

The present invention will be described below more fully. In the following description, unless otherwise indicated, percent with respect to a steel composition refers to mass percent.

(A) Chemical Composition of the Steel

According to one form of the present invention, a steel pipe for an airbag system is made of a steel which has the above-described specific steel composition in which the Ti and Mn contents satisfy the following Equations (1) and (2):

$$Ti \leq 0.02\% \quad (1)$$

$$0.4\% \leq Mn+40Ti \leq 1.2\% \quad (2).$$

The content of either one of Ti and Mn may be zero percent.

The reasons for the ranges for the various elements in the specific steel composition according to the present invention are as follows.

C: 0.05-0.20%

Carbon (C) is an element which is effective for inexpensively increasing the strength of steel. If the content thereof is less than 0.05%, it is difficult to obtain a desired tensile strength of at least 1000 MPa, while if its content exceeds 0.20%, workability and weldability decrease. A preferred range for the C content is 0.08-0.20%, and a more preferred range is 0.12-0.17%.

Si: 0.1-1.0%

Silicon (Si) is an element which has a deoxidizing action and which also increases the hardenability and strength of steel. In view of these activities of Si, its content is made at least 0.1%. However, if the Si content exceeds 1.0%, toughness decreases. A preferred range for the Si content is 0.2-0.5%.

P: at most 0.025%

Phosphorus (P) brings about a decrease in toughness caused by grain boundary segregation. The decrease in toughness becomes particularly marked when the P content exceeds 0.025%. The P content is preferably at most 0.020% and more preferably at most 0.015%.

S: at Most 0.010%

Sulfur (S) decreases toughness particularly in the T direction, i.e., the circumferential direction of a steel pipe. In particular, if the S content exceeds 0.010%, there is a marked decrease in toughness in the T direction of a steel pipe. The S content is preferably at most 0.005%, and still more preferably at most 0.003%.

Cr: 0.05-1.0%

Chromium (Cr) is an element which is effective for increasing the strength and toughness of steel. If the content thereof is less than 0.05%, it becomes difficult to obtain a tensile strength of at least 1000 MPa. However, if the Cr content exceeds 1.0%, it leads to a decrease in the toughness of welded portions. A preferred range for the Cr content is 0.2-0.8%, and a more preferred range is 0.4-0.7%.

Al: at Most 0.10%

Aluminum (Al) is an element which has a deoxidizing action and which is effective for increasing toughness and workability. However, if the content thereof exceeds 0.10%, the occurrence of scratch marks in the steel during rolling becomes marked. The Al content may be on the level of an impurity, so there is no particular lower limit, but it is preferably at least 0.005%. A preferred range for the Al content is 0.005-0.05%. In the present invention, the Al content refers to the content of acid soluble Al (so called sol. Al).

In order to guarantee toughness for a steel pipe for an airbag system having the above-described specific steel composition and to obtain a strength of at least 1000 MPa, it is necessary to control the Mn and Ti content so as to satisfy the above-described Equations (1) and (2).

Ti: 0-0.02%

The addition of titanium (Ti) to the steel composition of a steel pipe according to the present invention is optional. If Ti is added, the content is at most 0.02% so as to satisfy Equation (1). There is no particular lower limit, and it may be present on the level of an impurity.

Ti has a deoxidizing action. In addition, it has a strong affinity for N, and at high temperatures, it stably exists as a Ti nitride. Accordingly, it suppresses crystal grain growth at the time of hot rolling and contributes to an increase in toughness. In order to obtain such an effect from Ti, the Ti content is preferably at least 0.003%. However, if the Ti content exceeds 0.02%, toughness ends up decreasing. Accordingly, when Ti is added, the content thereof is preferably 0.003-0.02%.

Mn: up to 1.2%

Manganese (Mn) is an element which has a deoxidizing action and which is effective for increasing the hardenability of steel and for increasing strength and toughness, so Mn may be present in an amount of up to 1.0%. A sufficient hardness and toughness are not obtained when the content thereof is less than 0.20%, so the Mn content is preferably at least 0.20%. On the other hand, if the Mn content exceeds 1.0%, coarse MnS grains may form in the steel and they may be extended during hot rolling, thereby causing toughness to decrease. Therefore, the Mn content is preferably 0.20-1.0% and more preferably 0.4-0.8%.

The Ti and Mn content is controlled so as to satisfy Equation (2). If the value of (Mn+40Ti) is less than 0.4% or greater than 1.2%, the desired high tensile strength and/or high toughness cannot be obtained. The value of (Mn+40Ti) is preferably in the range of 0.4-0.8%.

When it is desired to further improve the strength, resistance to bursting, and/or weldability of a steel, in addition to the above-described elements, one or more of Mo, Ni, Cu, V, Nb, B, Ca, Mg, and REM may optionally be added within their respective ranges described below to the steel composition for a steel pipe according to the present invention.

Mo, Ni, B, V:

Each of molybdenum (Mo), nickel (Ni), boron (B), and vanadium (V) has the effect of increasing hardenability, and one or more of these elements may be added as optional elements.

Mo also has the effect of increasing strength through solid-solution hardening and precipitation hardening. These effects of Mo are obtained even when its content is on the level of an impurity, but in order to obtain a more marked effect, the content of Mo is preferably at least 0.05%. However, if the content of Mo exceeds 0.50%, welded portions are hardened and toughness decreases and if the content of Mo exceeds 1.0%, welded portions are considerably hardened and toughness decreases. Therefore, when molybdenum is added, the content of Mo is 0.05-1.0%, preferably 0.05-0.70%, more preferably 0.05-0.50%, and further more preferably 0.1-0.35%.

Ni also has the effect of increasing toughness. This effect of Ni is obtained even when its content is on the level of an impurity, but in order to obtain a more marked effect, the content of Ni is preferably at least 0.05%. However, Ni is an expensive element, and costs increase markedly when the content thereof exceeds 1.5%. Therefore, when Ni is added, its content is preferably 0.05-1.5% and more preferably 0.1-1.0%.

The effect of B on increasing hardenability is obtained even when its content is on the level of an impurity, but in order to obtain a more marked effect, the content of B is preferably at least 0.0003%. However, if the content of B exceeds 0.005%, toughness decreases. Therefore, when B is added, its content is preferably 0.0003-0.005%. A more preferred range for the B content is 0.0003-0.002%.

V also has the effect of increasing strength through precipitation hardening. This effect of V is obtained when its content is at least 0.01%, but if the V content exceeds 0.2%, toughness decreases. Accordingly, when V is added, its content is preferably 0.01-0.2%. A more preferred range for the content of V is 0.03-0.10%.

Cu, Nb:

Each of copper (Cu) and niobium (Nb) has the effect of increasing toughness, and one or both of these elements may be added as optional elements.

The effect of Cu on increasing toughness can be obtained even when its content is on the level of an impurity, but in order to obtain a more marked effect, the Cu content is preferably at least 0.05% and more preferably at least 0.1%. However, Cu decreases the hot workability of steel, so when Cu is added, Ni is preferably also added in order to guarantee hot workability. If the content of Cu exceeds 0.5%, it may not be possible to guarantee good hot workability even if Ni is also added. Accordingly, the content of Cu when it is added is preferably 0.05-0.5%.

Nb has the effect of increasing toughness even when present on the level of an impurity, but in order to obtain a more marked effect, its content is preferably at least 0.003% and more preferably at least 0.005%. However, if the content of Nb exceeds 0.1%, toughness ends up decreasing. Accordingly, when Nb is added, its content is preferably 0.003-0.1%. A more preferred range for the Nb content is 0.003-0.03% and a still more preferred range is 0.005-0.02%.

Ca, Mg, REM:

When it is desired to guarantee even better resistance to bursting for a high strength steel pipe for an airbag system, one or more of calcium (Ca), magnesium (Mg), and rare earth metals (REM) may be added as optional elements.

Each of these elements improves the anisotropy of toughness, and increases the toughness in the T direction of a steel pipe, and as a result they have the effect of further increasing the resistance to bursting. This effect can be obtained even when the content is on the level of an impurity, but in order to obtain a more marked effect, the content of any of these elements which is added is preferably at least 0.0003%. However, if the content of any of these elements exceeds 0.01%, the formation of inclusions in the form of clusters occurs, leading to the occurrence of scratch marks. Accordingly, when any of these elements is added, the content of each added element is preferably 0.0003-0.01% and more preferably 0.0005-0.003%.

(B) Pipe Manufacture

In order to obtain a steel pipe for an airbag system according to the present invention, a seamless steel pipe or a welded steel pipe is made from a steel having the above-described chemical composition. A seamless steel pipe is preferred from the standpoint of reliability. There are no particular limitations on a method of manufacturing a seamless pipe or a welded pipe.

(C) Cold Working

A seamless or welded steel pipe made from the above steel is subjected to cold working under conditions selected so as to provide the pipe with a prescribed dimensional accuracy and surface quality. The cold working may be any type as long as it can provide a prescribed dimensional accuracy and surface quality. Examples of useful types of cold working are cold drawing and cold rolling. There are no particular restrictions on the degree of cold working, but it is preferably at least 3% in terms of reduction in area. In order to decrease the working force during cold working, softening heat treatment may be performed prior to cold working.

(D) Heat Treatment

After the cold working described above in (C), the steel pipe is subjected to heat treatment in order to guarantee that the steel pipe has the necessary tensile strength and in order to increase toughness in the T direction so as to also guarantee resistance to bursting. In order to provide the steel pipe with a high strength in the form of a tensile strength of 1000 MPa and resistance to bursting, the steel pipe is quenched after heating at a temperature of at least the $Ac_1$ transformation point of the steel, and then tempering is carried out at a temperature no higher than the $Ac_1$ transformation point of the steel.

If the heating temperature prior to quenching is less than the $Ac_1$ transformation point, good toughness in the T direction and therefore a good resistance to bursting cannot be guaranteed. The heating temperature is preferably a temperature of at least the $Ac_3$ transformation point of the steel, which is in the austenite region.

Heating at a high temperature for a long period causes a large amount of scale to be formed on the surface of a steel pipe and decreases the dimensional accuracy and surface quality and also leads to a decrease in resistance to bursting. Therefore, the heating is preferably rapid heating to a predetermined temperature followed by a short retention period at that temperature. The rapid heating is preferably carried out such that the rate of temperature increase is at least 10° C./sec. Such rapid heating can be achieved by high frequency induction heating or direct resistance heating, although there are no particular restrictions on the heating method. A particularly preferred heating method is high frequency induction heating.

Particularly in the case of such short-period heating, a preferred heating temperature is in the range of from 900° C. to 1000° C. and more preferably from 900° C. to 960° C. If the heating temperature is lower than 900° C., complete autstenitization may not be achieved during the short-term heating, thereby making it impossible to form a desired microstructure. Heating to a temperature exceeding 1000° C. may cause the γ grains to be coarsened to such a degree that the toughness is decreased.

The heating to a temperature of at least the $Ac_1$ transformation point of the steel is preferably performed in an atmosphere having as low an oxygen potential as possible from the standpoint of suppressing the formation of surface scale during heating. A reducing atmosphere is even more preferred.

After the steel pipe is heated at a temperature of at least the $Ac_1$ transformation point and preferably at least the $Ac_3$ transformation point of the steel, it is then quenched in order to obtain a desired tensile strength of at least 1000 MPa in a stable and reliable manner. Specifically, the cooling rate for quenching is at least approximately 5° C./sec in the temperature range of 850-500° C. Preferably, the cooling rate is at least 20° C./sec. Such quenching may be performed by water quenching.

Rapid heating to a temperature in the range of 900-1000° C. by high frequency induction heating followed by quenching at a cooling rate of at least 20° C./sec in the temperature range of 850-500° C. makes it possible to form a dense as-quenched microstructure characterized by the size of γ grains (size of pre-existing austenite grains as measured by the Bechet-Beaujard method according to JIS G0551) having a size number of 11 or larger in a stable manner. A steel pipe having such a microstructure has a particularly improved toughness and exhibits an excellent resistance to bursting as demonstrated by no cracks progressing significantly even in an internal pressure bursting test performed at −80° C.

A steel pipe which is cooled to approximately room temperature by quenching is then tempered at a temperature of no higher than the $Ac_1$ transformation point of the steel in order to provide the pipe with the desired tensile strength of at least 1000 MPa and resistance to bursting. The γ grain size does not vary by such tempering. It is difficult to obtain the above-described characteristics in a stable and a reliable manner if the temperature of tempering exceeds the $Ac_1$ transformation point. The tempering is preferably carried out by maintaining the steel pipe for at least 10 minutes at a temperature in the range of 450-700° C. After tempering, bends can be removed by a suitable straightener or similar device.

In this manner, according to the present invention, it is possible to provide a steel pipe for an airbag system which has a tensile strength of at least 1000 MPa and which has a high toughness as indicated by 100% ductile fracture at −40° C., preferably at −60° C., and more preferably at −80° C. in a Charpy impact test and by no cracks progressing significantly in an internal pressure bursting test at −40° C. and preferably at −80° C. The steel pipe can adequately cope with the recent trend in steel pipes for airbag systems towards higher accumulator pressures and lower wall thicknesses.

EXAMPLES

The following examples illustrate the present invention and demonstrate the effects thereof. These examples are to be considered in all respects as illustrative and not restrictive. The steels used in the examples had an $Ac_1$ transformation point in the range of from 700° C. to 760° C. and an $Ac_3$ transformation point in the range of from 820° C. to 880° C.

Example 1

Using steel billets having the chemical compositions shown in Table 1, a seamless steel pipe having nominal dimensions of an outer diameter of 70 mm and a wall thickness of 4.1 mm was manufactured from each billet by a hot working process which included heating the billet to 1250° C. and performing piercing and rolling by a conventional Mannesmann piercer-mandrel mill system. Each seamless steel pipe was then finished by cold drawing so as to have an outer diameter of 60.33 mm and a wall thickness of 3.35 mm. The pipe was then heated to 920° C. in a conventional walking beam furnace (heating rate: about 0.3° C. per second) with a temperature retention period of 10 minutes and then water quenched, after which it was tempered at a temperature which was no higher than the $Ac_1$ transformation point of the steel by heating in a conventional walking beam furnace (atmosphere: air). In this manner, three seamless steel pipes for airbag systems having different tensile strengths were manufactured for each steel composition by varying the conditions of tempering. The water quenching was performed such that the cooling rate in the temperature range of 850-500° C. was at least 20° C./sec.

A certain length of each steel pipe was cut open and unrolled at room temperature by cutting the pipe in a longitudinal direction thereof. A V-notch Charpy test piece having a width of 2.5 mm in accordance with JIS Z 2002 was taken from the opened pipe in the T direction, and a Charpy impact test was then performed on the test piece. A tensile test in accordance with the tensile test method for metallic materials set forth in JIS Z 2241 was carried out using a Number 11 test piece in accordance with JIS Z 2201, which was also taken from the opened pipe in the T direction. The lower temperature limit for guaranteeing a ductile fracture rate of 100% in the Charpy impact test (referred to below as vTrs 100) and the tensile strength of each pipe are shown in Table 2 and FIG. 1.

In addition, a bursting test was performed using a pipe piece having a length of 250 mm, which was cut from each steel pipe. Both ends of the 250 mm long pipe piece were closed by welding, and an increasing internal pressure was applied with a liquid at −40° C. until bursting of the pipe occurred. The resistance to bursting was evaluated based on the presence or absence of a crack progressing to either end of the burst pipe. The results are also shown in Table 2.

TABLE 1

| Steel Type | Steel Composition (mass %) | | | | | | | | | | | | |
|---|---|---|---|---|---|---|---|---|---|---|---|---|---|
| | C | Si | Mn | P | S | Cr | Mo | Cu | Ni | Nb | Ti | sol. Al | Mn + 40Ti |
| A | 0.11 | 0.30 | 1.62 | 0.015 | 0.002 | 0.82 | — | — | — | — | 0.042 | 0.031 | 3.3* |
| B | 0.13 | 0.31 | 1.42 | 0.013 | 0.002 | 0.61 | 0.31 | 0.31 | 0.25 | 0.021 | 0.031 | 0.031 | 2.66* |
| C | 0.16 | 0.31 | 0.74 | 0.015 | 0.002 | 0.61 | 0.31 | 0.30 | 0.24 | 0.021 | 0.011 | 0.031 | 1.18 |
| D | 0.15 | 0.30 | 0.50 | 0.014 | 0.002 | 0.61 | 0.31 | 0.31 | 0.25 | 0.021 | 0.007 | 0.032 | 0.78 |
| E | 0.11 | 0.30 | 0.18 | 0.012 | 0.002 | 0.62 | — | — | 0.07 | 0.008 | 0.005 | 0.031 | 0.38* |

*outside the range according to this invention

TABLE 2

| Steel Type | Pipe No. | TS (MPa) | vTrs100 (° C.) | Progress of brittle cracks in bursting test at 40° C.[1] |
|---|---|---|---|---|
| A | a | 1085 | −15 | Yes |
| | b | 1054 | −20 | Yes |
| | c | 1005 | −35 | Yes |
| B | d | 930 | −40 | No |
| | e | 862 | −55 | No |
| | f | 775 | −60 | No |
| C | g | 1075 | −40 | No |
| | h | 1035 | −55 | No |
| | i | 1007 | −65 | No |
| D | j | 1102 | −80 | No |
| | k | 1054 | −100 | No |
| | l | 1008 | −110 | No |
| E | m | 800 | −65 | No |
| | n | 762 | −75 | No |
| | o | 684 | −80 | No |

[1]The presence of brittle cracks extending to either end of the pipe in a bursting test at −40° C.

As can be seen from Table 2 and FIG. 1, for a steel having a high Mn content such that (Mn+40Ti) exceeded the range defined by Equation (2), if it was attempted to make the strength at least 1000 MPa, vTrs100 was higher than −40° C. Therefore, brittle cracks developed during the bursting test under hydrostatic pressure at −40° C. with Steel Pipes a, b, and c of Steel A, indicating that this steel was unsuitable for a steel pipe for an airbag system. With Steel Pipes d, e, and f of Steel B, if it was attempted to satisfy vTrs100≦−40° C., it was not possible to obtain a strength of at least 1000 MPa. On the other hand, for Steel E in which Mn was reduced such that (Mn+40Ti) was below the range defined by Equation (2), a uniform hardened structure was not obtained, and even if the tempering temperature was adjusted, not only was a strength of at least 1000 MPa not obtained, but the strength level did not even reach that of Steel Pipes d, e, and f of Steel B.

A tendency for vTrs100 to increase as the tensile strength increases can be seen. For Steel A, the tensile strength exceeded 1000 MPa, but vTrs100 greatly exceeded −40° C. However, for Steel Pipes g to l of Steel C and Steel D which had the specific steel composition according to the present invention and also satisfied Equations (1) and (2), the strength was at least 1000 MPa, and vTrs was −40° C. or lower.

Example 2

Steel billets having the chemical compositions shown in Table 3 were each heated to 1250° C., after which each billet was pierced and hot rolled with a conventional Mannesmann piercer-mandrel mill system to obtain a seamless steel pipe with nominal dimensions of an outer diameter of 70 mm and a wall thickness of 4.1 mm. Each pipe was then subjected to cold drawing by a conventional method to provide the pipe with finished dimensions of an outer diameter of 60.33 mm and a wall thickness of 3.35 mm.

Steel Numbers 1-22 in Table 3 are steels for which the steel compositions satisfy the conditions prescribed by the present invention, and Steel Numbers 23-27 are comparative steels for which the contents of some elements do not satisfy the conditions prescribed for the present invention.

Each steel pipe which had been subjected to cold drawing was heated to 920° C. in a conventional walking beam furnace, and it was held in the furnace for 10 minutes and then water quenched, after which it was heated at a temperature of lower than the $Ac_1$ transformation point of the steel for 30 minutes in a conventional walking beam furnace to perform tempering.

For each of the heat treated steel pipes, a tensile test, a Charpy impact test, and a bursting test were performed.

The Charpy impact test was carried out using a V-notch Charpy test piece with a width of 2.5 mm as prescribed by JIS Z 2202 taken in the circumferential direction (the T direction) from a sample of each steel pipe, which was cut open at room temperature in the same manner as described in Example 1, and toughness was evaluated based on vTrs100.

The tensile test was performed in accordance with the tensile test method prescribed by JIS Z 2241 using a Number 11 test piece prescribed by JIS Z 2201 taken in the same manner as for the Charpy impact test.

For the internal pressure bursting test, five steel pipe pieces each having a length of 250 mm were cut from each steel pipe, both ends of each 250 mm steel pipe piece were closed by welding, internal pressure was applied with a liquid, and the extent to which cracks had progressed at the time of bursting at −40° C. was observed. The resistance to bursting was evaluated based on the number of pipes for which a crack progressed to either end among the five pipes which were tested.

The results of each of the above-described tests are shown in Table 4.

Example 3

Seamless steel pipes having steel compositions shown in Table 3 were manufactured in the same manner as described in Example 2 except that the conditions for heat treatment were changed.

In this example, a steel pipe, which had been finished by piercing, hot rolling, and cold working as described in Example 2, was heated to 920° C. using a high frequency induction heating apparatus at a heat-up rate of about 20° C./sec, and the induction heating was continued for 5 seconds after the temperature of the steel pipe reached 920° C. Thereafter, using the same procedure as in Example 2, the heated steel pipe was water quenched and tempered at a temperature of lower than the $Ac_1$ transformation point of the steel for 30 minutes in a conventional walking beam furnace.

For each of the steel pipes, the γ grain size number of the steel was determined by the Bechet-Beaujard method according to JIS G0551. The tensile strength and vTrs100 of the steel pipe were determined in the same manner as described in Example 2. An internal pressure bursting test was performed in the same manner as described in Example 1 but at a temperature of −80° C. rather than −40° C., and the resistance to bursting was evaluated based on the presence or absence of a crack progressing to either end of the burst pipe. The results are also shown in Table 4.

From Table 4, it can be seen that for Steel Numbers 1-22 which had a composition according to the present invention, even when the heating for quenching was performed by furnace heating as in Example 2, the tensile strength was at least 1000 MPa and the value of vTrs100 in the T direction in the Charpy impact test was −40° C. or lower. In addition, in the bursting test at −40° C., cracks did not progress to the ends of the pipes. When the heating for quenching was rapid heating by high frequency induction heating with a short period of temperature retention as in Example 3, the steel had a fine as-quenched microstructure having a γ grain size number of 11 or larger. The steel pipe generally had an increased tensile strength, and its toughness was also further improved as demonstrated by the value of vTrs100, which was −90° C. or lower. As a result, no crack progression was found in the bursting test at −80° C.

When the composition included at least one of Mo, Ni, V, and B, the hardenability was superior compared to when these elements were not present, so a uniform hardened-tempered structure was easily obtained, and there was an excellent balance between strength and toughness. As a result, the strength could be further increased without a decrease in toughness.

When at least one of Cu, Nb, Ca, Mg, and REM was present, vTrs100 was lower compared to when these elements were not present, and the toughness was even better.

For Steel Number 23, the content of Mn was higher than the range for the present invention and Equation (2) was not satisfied, so its toughness decreased, vTrs100 was −35° C. in the case of quenching after furnace heating, and the resistance to bursting decreased.

For Steel Number 24, the value of (Mn+40Ti) exceeded the upper limit defined by Equation (2) and the toughness decreased, so vTrs was −20° C. in the case of quenching after furnace heating, and the resistance to bursting decreased.

For Steel Number 25, the value of (Mn+40Ti) was below the lower limit defined by Equation (2), so even when the tempering temperature was adjusted, a tensile strength of 1000 MPa could not be obtained.

Steel Number 26 had a Cr content which was higher than the range for the present invention and the toughness of welded portions was decreased, so vTrs was −20° C. in the case of quenching after furnace heating, and the resistance to bursting was decreased.

For Steel Number 27, the Cr content was lower than the range for the present invention, and the hardenability was decreased. Therefore, a non-uniform structure resulted, and even when the tempering temperature was adjusted, a strength of 1000 MPa could not be obtained. In addition, the resistance to bursting was not satisfactory.

In each of these comparative steels, when quenching was performed by high frequency induction heating as in Example 3, vTrs was not −80° C. or lower, so cracks progressed in the bursting test at −80° C.

Figure 2:
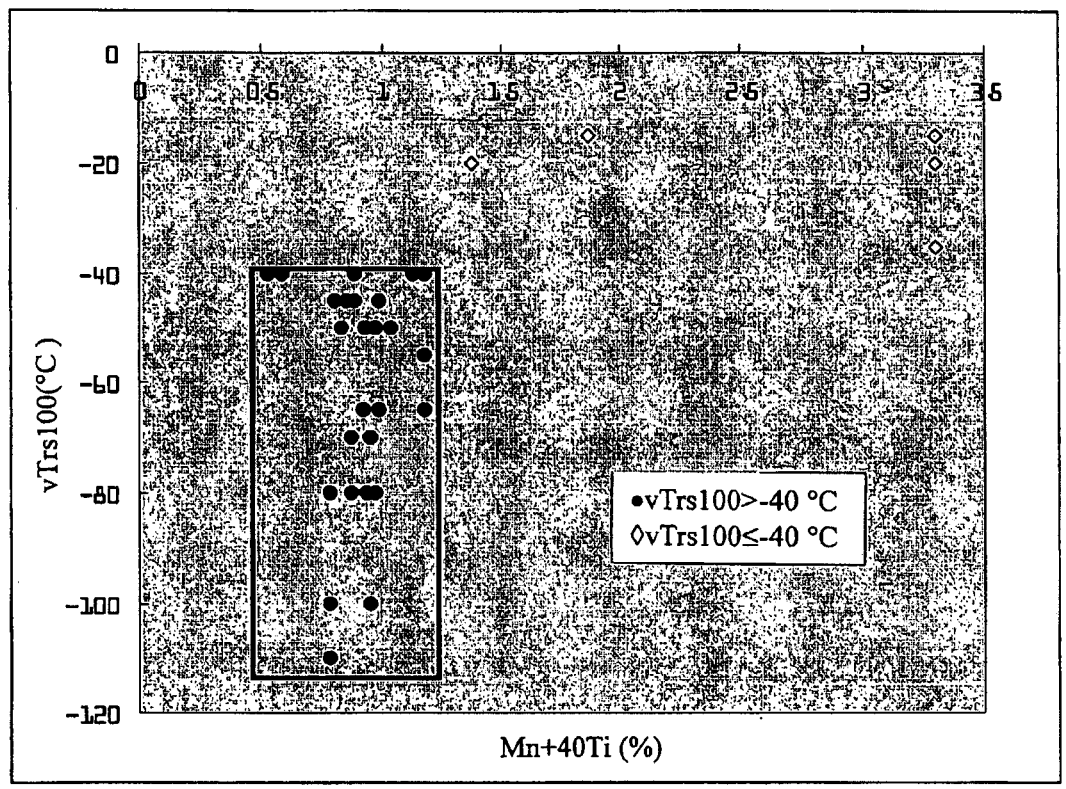
FIG. 2 is a graph showing the tensile strength in the circumferential direction of a steel pipe according to the present invention and according to the prior art as a function of the value of (Mn+40Ti).
Figure 1:
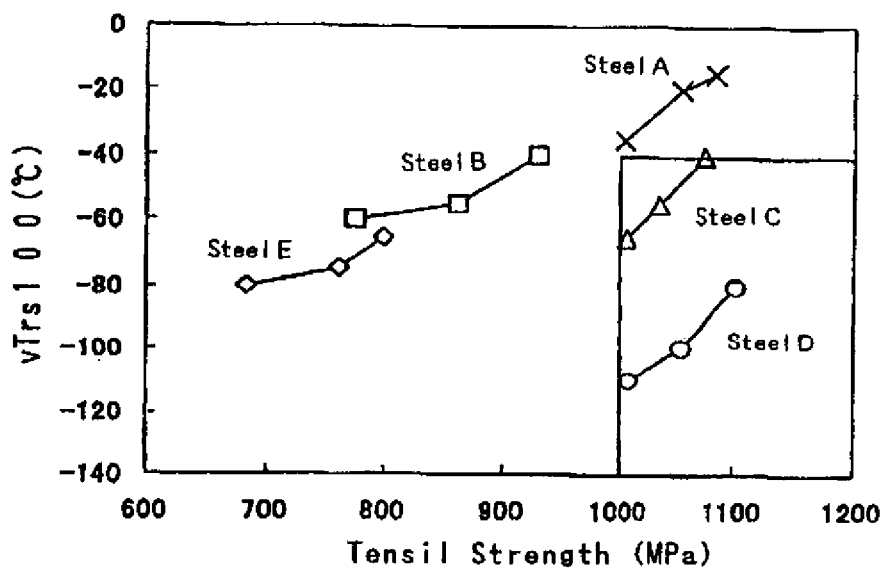
Figure 2:
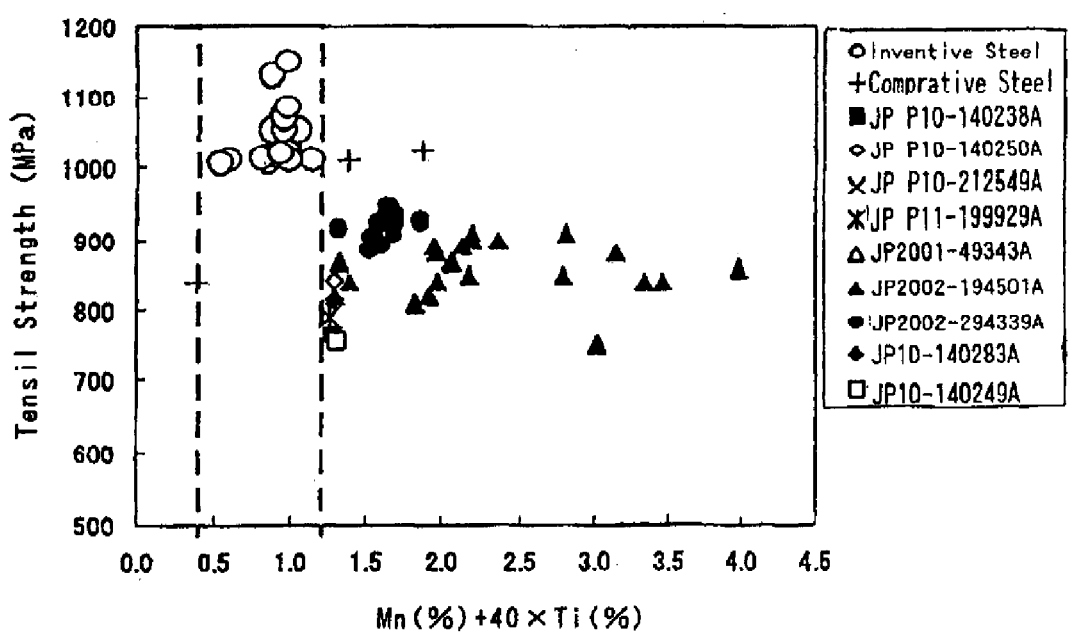

In order to compare the present invention with the prior art, FIG. 2 shows the relationship between the value of (Mn+40Ti) in Equation (2) and the tensile strength for examples of the present invention and examples of the prior art in the above-mentioned patent documents having the specific steel composition according to the present invention except for Equation (2). As can be seen from FIG. 2, when Equation (2) is satisfied, the strength can be increased to an extremely high level of 1000 MPa.

Although the present invention has been described with respect to preferred embodiments, they are merely illustrative and not intended to limit the present invention. It should be understood by those skilled in the art that various modifications of the embodiments described above can be made without departing from the scope of the present invention as set forth in the claims.

TABLE 3

| Steel No. | Chemical Composition (mass %) | | | | | | | | | | | | | | | | | Mn + 40Ti |
|---|---|---|---|---|---|---|---|---|---|---|---|---|---|---|---|---|---|---|
| | C | Si | Mn | P | S | Cr | Ti | Al | Mo | Ni | V | B | Cu | Nb | Ca | Mg | REM | |
| 1 | 0.15 | 0.31 | 0.81 | 0.008 | 0.001 | 0.60 | 0.008 | 0.035 | — | — | — | — | — | — | — | — | — | 1.13 |
| 2 | 0.15 | 0.30 | 0.55 | 0.015 | 0.002 | 0.56 | 0.001 | 0.035 | 0.29 | — | — | — | — | — | — | — | — | 0.59 |
| 3 | 0.14 | 0.31 | 0.45 | 0.015 | 0.002 | 0.52 | 0.002 | 0.029 | — | 0.22 | — | — | — | — | — | — | — | 0.53 |
| 4 | 0.16 | 0.29 | 0.53 | 0.011 | 0.003 | 0.64 | 0.009 | 0.032 | — | — | 0.05 | — | — | — | — | — | — | 0.89 |
| 5 | 0.16 | 0.34 | 0.41 | 0.012 | 0.003 | 0.61 | 0.011 | 0.033 | — | — | — | 0.0011 | — | — | — | — | — | 0.85 |
| 6 | 0.09 | 0.31 | 0.47 | 0.009 | 0.002 | 0.60 | 0.013 | 0.033 | 0.32 | 0.25 | — | — | — | — | — | — | — | 0.99 |
| 7 | 0.12 | 0.35 | 0.44 | 0.011 | 0.004 | 0.12 | 0.012 | 0.028 | 0.31 | 0.24 | 0.03 | — | — | — | — | — | — | 0.92 |
| 8 | 0.15 | 0.32 | 0.45 | 0.008 | 0.003 | 0.56 | 0.011 | 0.033 | 0.17 | — | — | 0.0021 | — | — | — | — | — | 0.89 |
| 9 | 0.16 | 0.35 | 0.45 | 0.009 | 0.003 | 0.58 | 0.013 | 0.025 | — | — | — | — | 0.33 | — | — | — | — | 0.97 |
| 10 | 0.13 | 0.27 | 0.43 | 0.012 | 0.003 | 0.55 | 0.011 | 0.022 | — | — | — | — | — | 0.018 | — | — | — | 0.87 |
| 11 | 0.14 | 0.33 | 0.51 | 0.012 | 0.003 | 0.21 | 0.009 | 0.035 | 0.33 | — | — | — | 0.31 | — | — | — | — | 0.87 |
| 12 | 0.15 | 0.30 | 0.50 | 0.008 | 0.001 | 0.60 | 0.011 | 0.035 | 0.32 | 0.24 | — | — | 0.32 | 0.025 | — | — | — | 0.94 |
| 13 | 0.15 | 0.30 | 0.51 | 0.015 | 0.002 | 0.62 | 0.008 | 0.029 | — | — | — | — | — | — | 0.0023 | — | — | 0.83 |
| 14 | 0.14 | 0.32 | 0.44 | 0.013 | 0.002 | 0.66 | 0.009 | 0.032 | — | — | — | — | — | — | — | 0.0008 | — | 0.80 |
| 15 | 0.16 | 0.29 | 0.55 | 0.012 | 0.003 | 0.64 | 0.011 | 0.033 | — | — | — | — | — | — | — | — | 0.0015 | 0.99 |
| 16 | 0.14 | 0.33 | 0.49 | 0.011 | 0.003 | 0.33 | 0.011 | 0.022 | — | — | — | — | — | — | 0.0015 | 0.0012 | — | 0.93 |
| 17 | 0.16 | 0.34 | 0.52 | 0.012 | 0.003 | 0.59 | 0.013 | 0.033 | 0.31 | — | — | — | — | — | 0.0021 | — | — | 1.04 |
| 18 | 0.09 | 0.36 | 0.47 | 0.009 | 0.002 | 0.60 | 0.012 | 0.028 | 0.15 | — | 0.05 | 0.0022 | — | 0.018 | — | — | — | 0.95 |
| 19 | 0.16 | 0.36 | 0.51 | 0.011 | 0.004 | 0.60 | 0.011 | 0.033 | 0.29 | — | — | — | 0.23 | 0.010 | 0.0022 | — | — | 0.95 |
| 20 | 0.15 | 0.32 | 0.45 | 0.008 | 0.003 | 0.56 | 0.013 | 0.025 | — | — | — | — | 0.25 | 0.021 | 0.0021 | 0.0011 | — | 0.97 |
| 21 | 0.16 | 0.33 | 0.43 | 0.009 | 0.003 | 0.58 | 0.011 | 0.022 | 0.30 | 0.25 | — | — | 0.30 | 0.022 | 0.0023 | — | — | 0.87 |
| 22 | 0.14 | 0.34 | 0.45 | 0.015 | 0.003 | 0.63 | 0.013 | 0.025 | 0.30 | 0.31 | 0.04 | — | 0.18 | 0.008 | 0.0012 | 0.0008 | 0.0007 | 0.97 |
| 23 | 0.15 | 0.31 | 1.51 | 0.008 | 0.001 | 0.60 | 0.009 | 0.035 | — | — | — | — | 0.31 | 0.019 | — | — | — | 1.87* |

TABLE 3-continued

| Steel No. | Chemical Composition (mass %) | | | | | | | | | | | | | | | | Mn + 40Ti |
|---|---|---|---|---|---|---|---|---|---|---|---|---|---|---|---|---|---|
| | C | Si | Mn | P | S | Cr | Ti | Al | Mo | Ni | V | B | Cu | Nb | Ca | Mg | REM | |
| 24 | 0.16 | 0.30 | 0.62 | 0.015 | 0.002 | 0.56 | 0.019 | 0.035 | 0.29 | — | — | — | — | — | — | — | — | 1.38* |
| 25 | 0.12 | 0.31 | 0.23 | 0.008 | 0.001 | 0.56 | 0.004 | 0.035 | — | — | — | — | — | — | — | — | — | 0.39* |
| 26 | 0.15 | 0.30 | 0.70 | 0.015 | 0.002 | 1.54* | 0.011 | 0.035 | — | — | 0.02 | — | — | — | — | — | — | 1.14 |
| 27 | 0.15 | 0.30 | 0.65 | 0.015 | 0.002 | —* | 0.011 | 0.035 | 0.29 | — | — | — | — | 0.021 | — | — | — | 1.09 |

*Outside the range according to this invention..

TABLE 4

| | Example 2: quenching by furnace heating (920° C. × 10 minutes) | | | Example 3: quenching by high frequency induction heating (920° C. × 5 seconds) | | | | |
|---|---|---|---|---|---|---|---|---|
| Steel No. | TS (MPa) | vTrs100 (° C.) | Results of bursting test at −40° C.[1] | γ gram size number | TS (MPa) | vTrs100 (° C.) | Results of bursting test at −80° C.[2] | Remarks |
| 1 | 1011 | −40 | 0 | 11.0 | 1023 | −90 | No | This |
| 2 | 1011 | −40 | 0 | 12.0 | 1050 | −100 | No | Invention |
| 3 | 1005 | −40 | 0 | 11.5 | 1021 | −100 | No | |
| 4 | 1012 | −40 | 0 | 12.0 | 1025 | −100 | No | |
| 5 | 1008 | −45 | 0 | 12.0 | 1026 | −100 | No | |
| 6 | 1025 | −65 | 0 | 11.5 | 1035 | −110 | No | |
| 7 | 1033 | −65 | 0 | 12.0 | 1045 | −110 | No | |
| 8 | 1015 | −45 | 0 | 12.0 | 1021 | −100 | No | |
| 9 | 1022 | −50 | 0 | 11.5 | 1037 | −90 | No | |
| 10 | 1015 | −70 | 0 | 12.0 | 1023 | −100 | No | |
| 11 | 1053 | −70 | 0 | 11.5 | 1017 | −110 | No | |
| 12 | 1073 | −80 | 0 | 12.5 | 1112 | −120 | No | |
| 13 | 1015 | −50 | 0 | 11.0 | 1010 | −100 | No | |
| 14 | 1013 | −45 | 0 | 11.0 | 1012 | −90 | No | |
| 15 | 1011 | −45 | 0 | 11.0 | 1019 | −90 | No | |
| 16 | 1021 | −50 | 0 | 11.5 | 1030 | −90 | No | |
| 17 | 1053 | −50 | 0 | 11.5 | 1070 | −90 | No | |
| 18 | 1056 | −70 | 0 | 11.5 | 1086 | −90 | No | |
| 19 | 1071 | −100 | 0 | 12.0 | 1120 | −120 | No | |
| 20 | 1087 | −80 | 0 | 12.5 | 1134 | −110 | No | |
| 21 | 1131 | −80 | 0 | 12.5 | 1162 | −90 | No | |
| 22 | 1150 | −80 | 0 | 12.5 | 1170 | −90 | No | |
| 23 | 1023 | −15 | 4 | 11.5 | 1058 | −60 | Yes | Comparative |
| 24 | 1008 | −20 | 3 | 11.0 | 1027 | −60 | Yes | Examples |
| 25 | 840 | −40 | 0 | 10.5 | 984 | −60 | Yes | |
| 26 | 1005 | −20 | 3 | 12.5 | 1180 | −60 | Yes | |
| 27 | 765 | −35 | 1 | 10.0 | 954 | −70 | Yes | |

[1] Number of steel pipes having cracks extending to either end thereof among 5 pipes tested.
[2] Presence of cracks extending to either end of the steel pipe tested.

Example 4

Steel billets having the chemical compositions shown in Table 5 were each heated to 1250° C., and then each billet was forged with a finishing temperature of 900° C. or higher to form a 25 mm-thick plate. After holding at 1200° C. for 1 hour, the heated steel sheet was hot rolled to obtain a 6 mm thick plate. After air cooling, each steel plate was then heated to 920° C., and it was held in the furnace for 10 minutes and then water-quenched. After being quenched, the steel plate was subjected to soaking at 600° C. for 30 minutes to perform tempering.

From each of the heat treated steel plates, a rod-shaped test piece having a diameter of 4 mm was cut in a direction parallel to the rolling direction, and a tensile strength test was performed for them.

A 3 mm-thick Charpy test piece was also cut from each of the plates in a direction perpendicular to the rolling direction, and for each of the test pieces, a Charpy impact test was performed.

TABLE 5

| Steel No. | Steel Composition | | | | | | | | | | | | |
|---|---|---|---|---|---|---|---|---|---|---|---|---|---|
| | C | Si | Mn | P | S | Cr | Ti | Al | Mo | Ni | Cu | Nb | Ca |
| 28 | 0.14 | 0.27 | 0.30 | 0.011 | 0.0007 | 0.61 | 0.01 | 0.04 | 0.61 | 0.29 | 0.30 | 0.025 | 0.0015 |

Result: TS: 1025 MPa
Vtrs100%: −140° C.

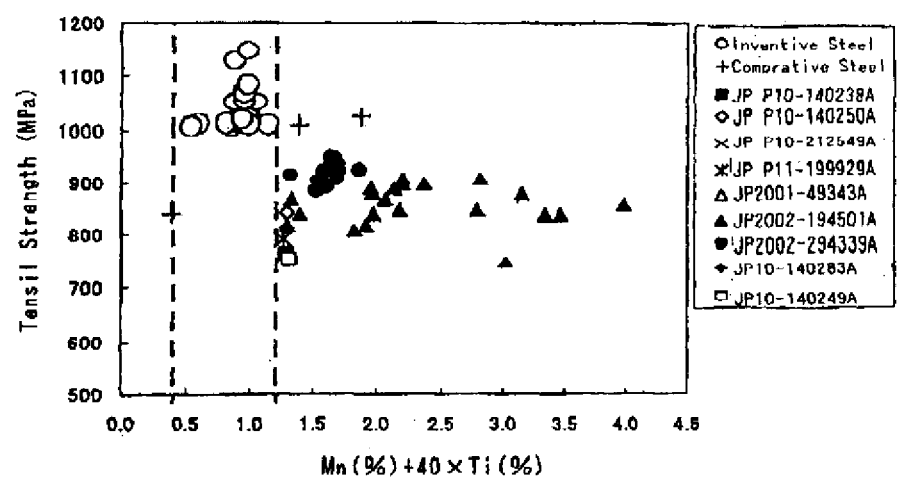

What is claimed is:

1. A steel pipe for an airbag system having a steel composition which consists essentially, in mass %, of: C: 0.05-0.20%, Si: 0.1-1.0%, P: at most 0.025%, S: at most 0.010%, Cr: 0.05-1.0%, Al: at most 0.10%, at least one of Ti and Mn in amounts satisfying the following equations (1) and (2), Mo: 0-1.0%, Ni: 0-1.5%, V: 0-0.2%, B: 0-0.005%, Cu: 0-0.5%, Nb: 0-0.1%, Ca: 0-0.01%, Mg: 0-0.01%, REM: 0-0.01%, and a remainder of Fe and impurities, $$Ti \leq 0.02\% \qquad (1)$$

$$0.4\% \leq Mn + 40Ti \leq 1.2\% \qquad (2)$$

wherein the symbols for elements in the above equation indicate the mass % of the elements, the steel pipe having a tensile strength of at least 1000 MPa, and a low temperature toughness $vTrs_{100}$ being equal to or lower than −40° C.

2. A steel pipe for an airbag system as claimed in claim 1 wherein the steel composition contains at least 0.20 mass % of Mn.

3. A steel pipe for an airbag system as claimed in claim 1 wherein the steel composition contains, in mass at least one of Mo: 0.05-0.50%, Ni: 0.05-1.5%, V: 0.01-0.2%, and B: 0.0003-0.005%.

4. A steel pipe for an airbag system as claimed in claim 1 wherein the steel composition contains, in mass %, at least one of Cu: 0.05-0.5 and Nb: 0.003-0.1%.

5. A steel pipe for an airbag system as claimed in claim 1 wherein the steel composition contains, in mass %, at least one of Ca: 0.0003-0.01%, Mg: 0.0003-0.01%, and REM: 0.0003-0.01%.

6. A steel pipe for an airbag system as claimed in claim 1 wherein the steel has a microstructure having a γ grain size number which is 11 or larger.

7. A steel pipe for an airbag system having a steel composition which consists essentially, in mass %, of: C: 0.05-0.20%, Si: 0.1-1.0%, P: at most 0.025%, S: at most 0.010%, Cr: 0.05-1.0%, Al: at most 0.10%, at least one of Ti and Mn in amounts satisfying the following equations (1) and (2), Mo: 0-0.50%, Ni: 0-1.5%, V: 0-0.2%, B: 0-0.005%, Cu: 0-0.5%, Nb: 0-0.1%, Ca: 0-0.01%, Mg: 0-0.01%, REM: 0-0.01%, and a remainder of Fe and impurities, $$Ti \leq 0.02\% \qquad (1)$$

$$0.4\% \leq Mn + 40Ti \leq 1.2\% \qquad (2)$$

wherein the symbols for elements in the above equation indicate the mass % of the elements, the steel pipe having a tensile strength of at least 1000 MPa, and a low temperature toughness $vTrs_{100}$ being equal to or lower than −40° C.

8. A steel pipe for an airbag system as claimed in claim 7 wherein the steel composition contains at least 0.20 mass % of Mn.

9. A steel pipe for an airbag system as claimed in claim 7 wherein the steel composition contains, in mass %, at least one of Mo: 0.05-0.50%, Ni: 0.05-1.5%, V: 0.01-0.2%, and B: 0.0003-0.005.

10. A steel pipe for an airbag system as claimed in claim 7 wherein the steel composition contains, in mass %, at least one of Cu: 0.05-0.5%, and Nb: 0.003-0.1%.

11. A steel pipe for an airbag system as claimed in claim 7 wherein the steel composition contains, in mass %, at least one of Ca: 0.0003-0.01%, Mg: 0.0003-0.01%, and REM: 0.0003-0.01%.

12. A steel pipe for an airbag system as claimed in claim 7 wherein the steel has a microstructure having a γ grain size number which is 11 or larger.

* * * * *

UNITED STATES PATENT AND TRADEMARK OFFICE
CERTIFICATE OF CORRECTION

| | | |
|---|---|---|
| PATENT NO. | : 7,727,463 B2 | Page 1 of 4 |
| APPLICATION NO. | : 11/266265 | |
| DATED | : June 1, 2010 | |
| INVENTOR(S) | : Arai et al. | |

It is certified that error appears in the above-identified patent and that said Letters Patent is hereby corrected as shown below:

The Title page;

The Title page, showing the illustrative figure, should be deleted and substitute therefor the attached Title page.

Delete figs. 1 and 2 and substitute therefor the drawing sheets, consisting of figs. 1 and 2 as shown on the attached page.

Signed and Sealed this
Seventh Day of June, 2011

David J. Kappos
*Director of the United States Patent and Trademark Office*

United States Patent
Arai et al.

(10) Patent No.: US 7,727,463 B2
(45) Date of Patent: *Jun. 1, 2010

(54) STEEL PIPE FOR AN AIRBAG SYSTEM

(75) Inventors: Yuji Arai, Amagasaki (JP); Kunio Kondo, Sanda (JP)

(73) Assignee: Sumitomo Metal Industries, Ltd., Osaka (JP)

(*) Notice: Subject to any disclaimer, the term of this patent is extended or adjusted under 35 U.S.C. 154(b) by 106 days.

This patent is subject to a terminal disclaimer.

(21) Appl. No.: 11/266,265

(22) Filed: Nov. 4, 2005

(65) Prior Publication Data

US 2006/0130945 A1 Jun. 22, 2006

Related U.S. Application Data

(63) Continuation-in-part of application No. 10/848,119, filed on May 19, 2004, now abandoned.

(30) Foreign Application Priority Data

May 21, 2003 (JP) .............................. 2003-143764

(51) Int. Cl.
   C22C 38/18 (2006.01)
   C22C 38/00 (2006.01)
   C21D 1/00 (2006.01)
(52) U.S. Cl. .................. 420/104; 148/333; 148/570
(58) Field of Classification Search .............. 420/105, 420/104; 148/333, 334, 570
See application file for complete search history.

(56) References Cited

U.S. PATENT DOCUMENTS

| 2002/0033591 A1 | 3/2002 | Erike |
| 2003/0155052 A1 | 8/2003 | Kondo et al. |
| 2003/0217795 A1* | 11/2003 | Asahi et al. ............... 148/593 |
| 2005/0076975 A1 | 4/2005 | Lopez et al. |
| 2006/0070687 A1 | 4/2006 | Miyata et al. |

FOREIGN PATENT DOCUMENTS

| JP | 08-325641 | 12/1996 |
| JP | 10-140238 | 5/1998 |
| JP | 10-140249 | 5/1998 |
| JP | 10-140250 | 5/1998 |
| JP | 10-140283 | 5/1998 |

(Continued)

*Primary Examiner*—Roy King
*Assistant Examiner*—Caitlin Fogarty
(74) *Attorney, Agent, or Firm*—Clark & Brody

(57) ABSTRACT

A high strength steel pipe for an airbag system has a steel composition comprising C: 0.05-0.20%, Si: 0.1-1.0%, P: at most 0.025%, S: at most 0.010%, Cr: 0.05-1.0%, Al: at most 0.10%, at least one of Ti and Mn satisfying (1) Ti≦0.02% and (2) 0.4%≦Mn+40Ti≦1.2%, and a remainder of Fe. The composition may further include one or more of (i) at least one of Mo: 0.05-0.50%, Ni: 0.05-1.5%, V: 0.01-0.2%, and B: 0.0003-0.005%, (ii) at least one of Cu: 0.05-0.5% and Nb: 0.003-0.1%, and (iii) at least one of Ca: 0.0003-0.01%, Mg: 0.0003-0.01%, and REM: 0.0003-0.01%. The steel pipe can be manufactured by forming a pipe from the above-described steel composition to obtain prescribed dimensions, heating to at least the $Ac_1$ transformation point and quenching, and then tempering at the $Ac_1$ transformation point or below.

12 Claims, 2 Drawing Sheets

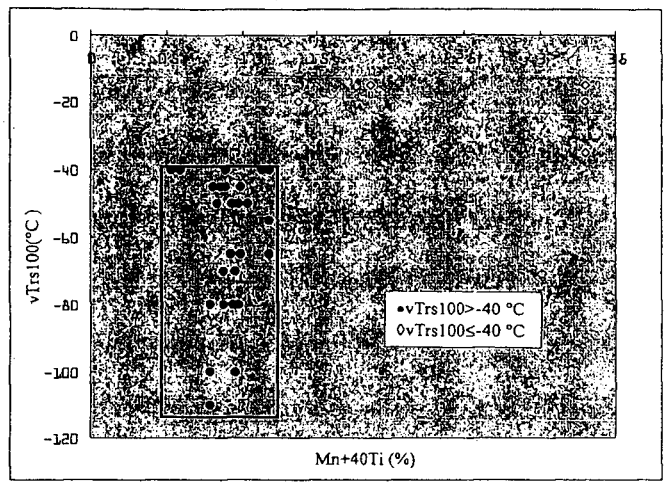

UNITED STATES PATENT AND TRADEMARK OFFICE
CERTIFICATE OF CORRECTION

| | | |
|---|---|---|
| PATENT NO. | : 7,727,463 B2 | |
| APPLICATION NO. | : 11/266265 | |
| DATED | : June 1, 2010 | |
| INVENTOR(S) | : Arai et al. | |

It is certified that error appears in the above-identified patent and that said Letters Patent is hereby corrected as shown below:

The Title page;

The Title page, showing the illustrative figure, should be deleted and substitute therefor the attached Title page.

Delete Drawing Sheet 1-2 and substitute therefor the drawing sheets 1-2, consisting of figs. 1 and 2 as shown on the attached page.

This certificate supersedes the Certificate of Correction issued June 7, 2011.

Signed and Sealed this
Twentieth Day of March, 2012

David J. Kappos
*Director of the United States Patent and Trademark Office*

(12) United States Patent
Arai et al.

(10) Patent No.: US 7,727,463 B2
(45) Date of Patent: *Jun. 1, 2010

(54) STEEL PIPE FOR AN AIRBAG SYSTEM

(75) Inventors: Yuji Arai, Amagasaki (JP); Kunio Kondo, Sanda (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 11/266,265

(22) Filed: Nov. 4, 2005

(65) Prior Publication Data
US 2006/0130945 A1 Jun. 22, 2006

Related U.S. Application Data

(63) Continuation-in-part of application No. 10/848,119, filed on May 19, 2004, now abandoned.

(30) Foreign Application Priority Data
May 21, 2003 (JP) .................. 2003-143764

(51) Int. Cl.
C22C 38/18 (2006.01)
C22C 38/00 (2006.01)
C21D 1/00 (2006.01)

(52) U.S. Cl. ............... 420/104; 148/333; 148/570

(58) Field of Classification Search .......... 420/105, 420/104; 148/333, 334, 570
See application file for complete search history.

(56) References Cited

U.S. PATENT DOCUMENTS

| | | |
|---|---|---|
| 2002/0033591 A1 | 3/2002 | Brike |
| 2003/0155052 A1 | 8/2003 | Kondo et al. |
| 2003/0217795 A1* | 11/2003 | Asahi et al. ............ 148/593 |
| 2005/0076975 A1 | 4/2005 | Lopez et al. |
| 2006/0070687 A1 | 4/2006 | Miyata et al. |

FOREIGN PATENT DOCUMENTS

| | | |
|---|---|---|
| JP | 08-325641 | 12/1996 |
| JP | 10-140238 | 5/1998 |
| JP | 10-140249 | 5/1998 |
| JP | 10-140250 | 5/1998 |
| JP | 10-140283 | 5/1998 |

(Continued)

*Primary Examiner*—Roy King
*Assistant Examiner*—Caitlin Fogarty
(74) *Attorney, Agent, or Firm*—Clark & Brody

(57) ABSTRACT

A high strength steel pipe for an airbag system has a steel composition comprising C: 0.05-0.20%, Si: 0.1-1.0%, P: at most 0.025%, S: at most 0.010%, Cr: 0.05-1.0%, Al: at most 0.10%, at least one of Ti and Mn satisfying (1) Ti≦0.02% and (2) 0.4%≦Mn+40Ti≦1.2%, and a remainder of Fe. The composition may further include one or more of (i) at least one of Mo: 0.05-0.50%, Ni: 0.05-1.5%, V: 0.01-0.2%, and B: 0.0003-0.005%, (ii) at least one of Cu: 0.05-0.5% and Nb: 0.003-0.1%, and (iii) at least one of Ca: 0.0003-0.01%, Mg: 0.0003-0.01%, and REM: 0.0003-0.01%. The steel pipe can be manufactured by forming a pipe from the above-described steel composition to obtain prescribed dimensions, heating to at least the Ac₁ transformation point and quenching, and then tempering at the Ac₁ transformation point or below.

12 Claims, 2 Drawing Sheets